Nov. 3, 1964  A. H. MEITZLER  3,155,926
ULTRASONIC STRIP DELAY LINES
Filed March 22, 1962  4 Sheets-Sheet 1
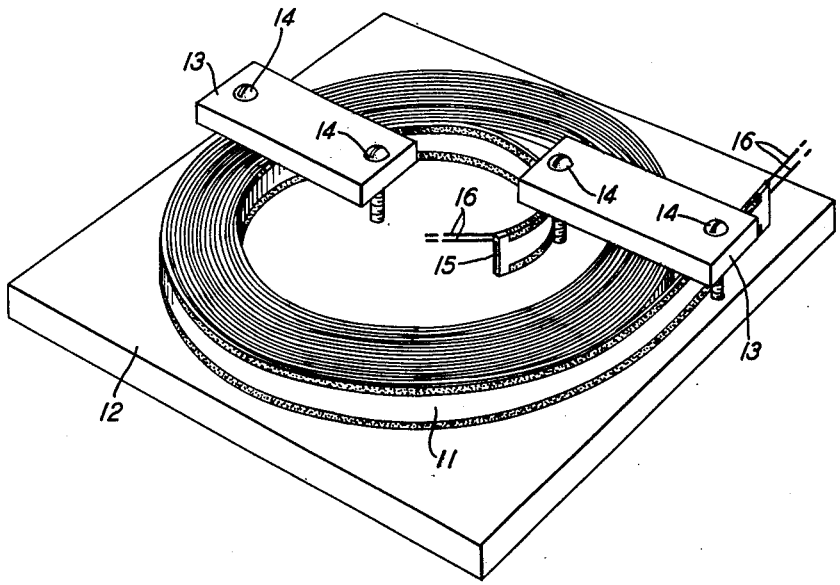
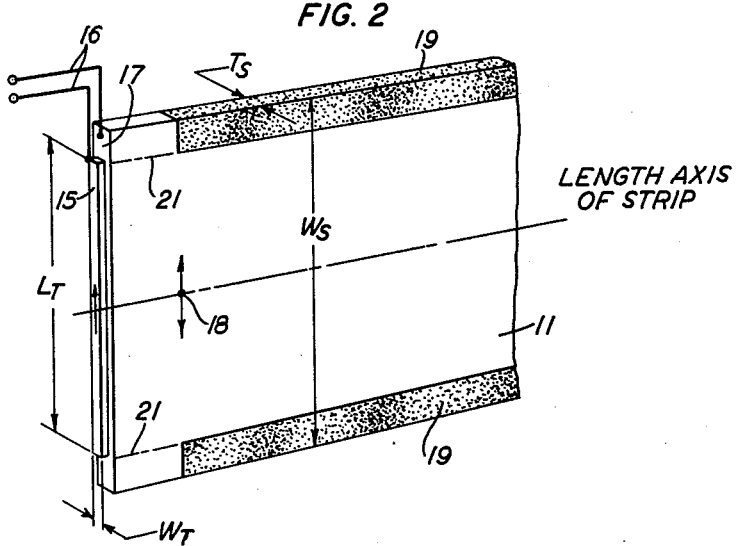
INVENTOR
A.H. MEITZLER
BY
ATTORNEY

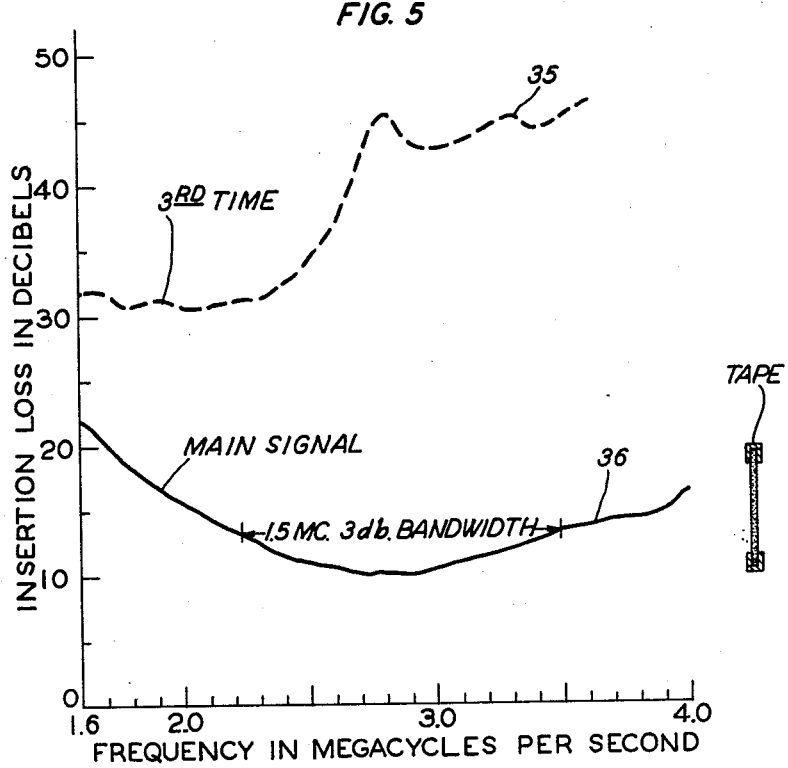

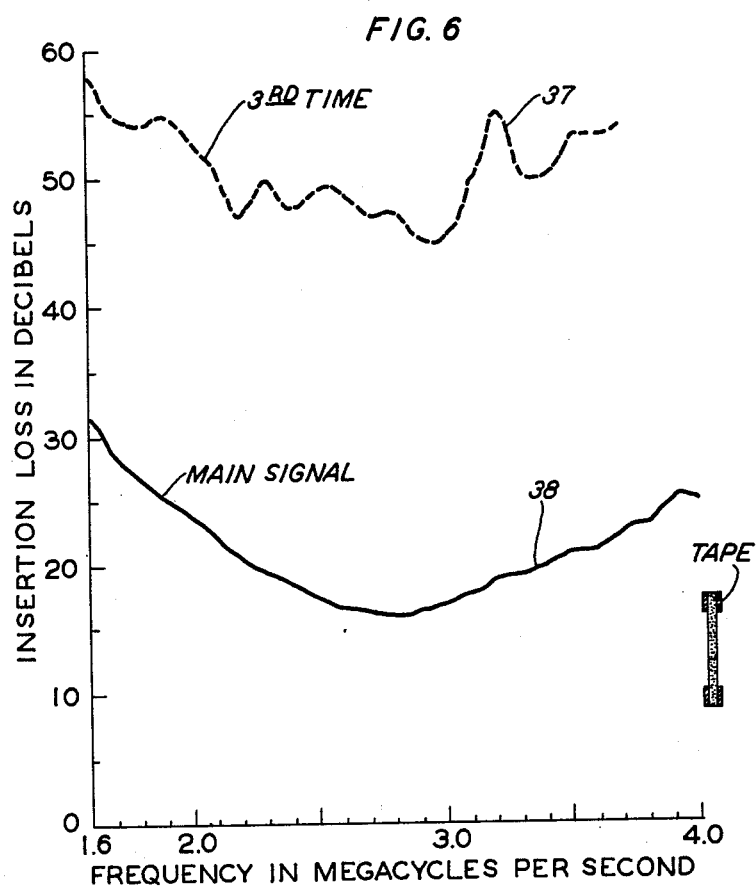

United States Patent Office  3,155,926
Patented Nov. 3, 1964

3,155,926
ULTRASONIC STRIP DELAY LINES
Allen H. Meitzler, Morristown, N.J., assignor to Bell Telephone Laboratories, Incorporated, New York, N.Y., a corporation of New York
Filed Mar. 22, 1962, Ser. No. 182,713
4 Claims. (Cl. 333—30)

This invention is a continuation in part of my copending application Serial No. 824,437 filed July 1, 1959, now United States Patent 3,041,556, granted June 26, 1962 and relates to delay devices, and more particularly to mechanical loading means for solid ultrasonic delay lines.

Solid ultrasonic delay lines are used in a variety of applications where it is necessary to delay or store pulses over periods ranging from 10 to 10,000 microseconds. Such applications include M.T.I. radar systems, computer memories and electronic switching systems.

The above-mentioned copending application discloses and claims a delay line having the form of an elongated thin strip whose width dimension is approximately ten or more times that of the thickness dimension. Thickness-shear mode transducers are used to generate an elastic shear wave motion in the delay medium. In this wave motion the individual particles in the strip move perpendicular to the length axis and the minor surfaces of the strip. The major surfaces of the strip guide the elastic wave motion in particular modes of propagation that do not lose energy as a result of reflections from said major surfaces. By suitable choice of delay line geometry and transducer arrangement, it is possible to obtain dispersive or nondispersive propagation characteristics.

In one specific embodiment of the invention there disclosed, nondispersive propagation is achieved by making the strip thin enough ($<\lambda/2$) that the high frequency limit of the desired passband is something less than the cut-off frequency of the lowest dispersive mode. This arrangement permits energy to propagate without rapid attenuation only in the nondispersive, zeroth mode. The width dimension of this strip is of the order of ten or more wavelengths.

In another embodiment, satisfactory propagation in the first dispersive mode is achieved by making the strip thickness somewhat greater than a half wavelength at the low frequency limit of the desired passband and less than one wavelength at the high frequency limit of said passband. At the cut-off frequency in the first dispersive mode, the thickness of the strip is equal to a half wavelength and at the cut-off frequency in the second dispersive mode, the thickness of the strip is equal to one wavelength. Accordingly, energy is propagated without rapid attenuation in the first dispersive mode but not in the second or higher dispersive modes.

Several operating difficulties have been experienced in practical applications of these delay lines. While most of the energy in the desired ultrasonic mode travels directly between the transducers in a main beam or main lobe, some of it diverges and travels out in side lobes which undergo reflection from the minor surfaces of the line. Energy reflected from the minor surfaces interferes with the energy in the main beam to produce ripples in the transmission characteristic. When the signal upon the line is a pulse, the reflected waves contribute to the trailing edge of the output pulse. Furthermore, imperfections in the delay medium itself can produce unwanted and spurious signals by creating a diverging wave motion at the point of imperfection.

Finally, and equally as important, is the difficulty encountered with what is referred to as the third-time-through signal, that is, energy which has been reflected by the output transducer, reflected again by the input transducer and arrives for the second time at the output transducer. So far as the output transducer is concerned, this reflected signal is indistinguishable from a latter but simultaneously arriving signal of initial incidence.

It is therefore an object of the present invention to improve the performance of ultrasonic delay lines.

In accordance with the present invention the minor surfaces and more particularly the adjacent portions of the major surfaces of strip delay lines are provided with mechanical loading that extends along a substantial portion of the line parallel to the direction of propagation of the main beam. Specifically, the minor surfaces and the adjacent portions of the major surfaces are coated or covered with absorbing material such as adhesive tape.

Each of the above-mentioned difficulties are improved by the particular loading in accordance with the invention. Diverging energy from either the transducer side lobes or from imperfections along the line is absorbed before it is reflected. Since the third-time-through signal naturally tends to diverge on its multiple travels, its level is selectively suppressed with respect to the level of the main signal.

It should be noted that each of the foregoing advantages of the loading in accordance with the invention is uniquely a function of the rectangular cross-section of the delay line. In other forms of delay lines with different cross-sections, such as the solid cylinder, the hollow cylinder, or the polygonal body, there is no known comparative way in which the diverging energy of spurious signals may be absorbed while at the same time leaving the main wave motion relatively unaffected. It should be further noted that these advantages of loading a line of rectangular cross-section obtained regardless of whether this line is excited in the longitudinal mode or in the transverse shear mode even though, for convenience, the disclosure which follows will be directed to shear mode operation.

These and other objects, features and advantages of the invention may be better understood by a consideration of the following detailed description when read in connection with the drawings in which:

FIG. 1 is a perspective view of a delay line system incorporating the principles of the present invention;

FIG. 2 is an enlarged fragmentary view of the input end of a nondispersive delay line constructed in accordance with the present invention;

Figure 3:
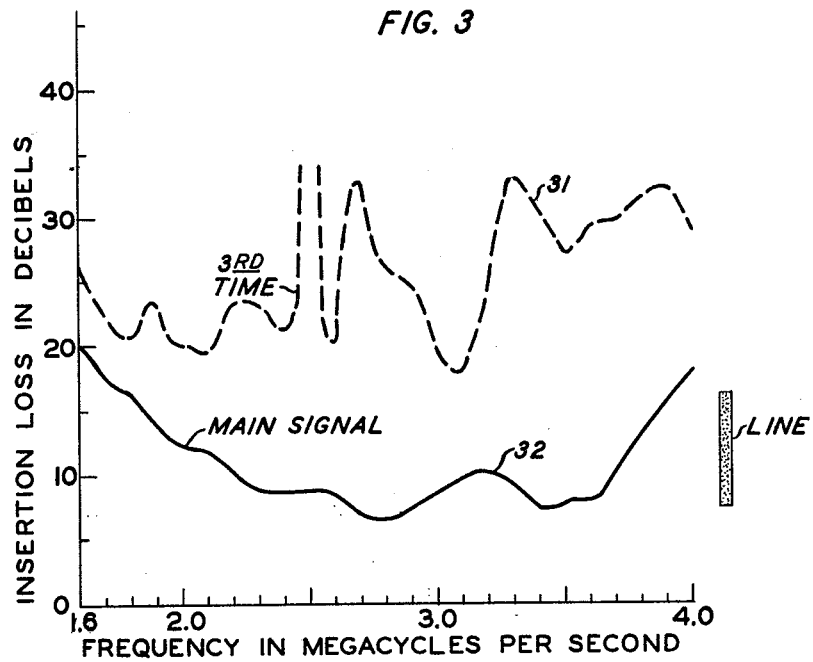

FIGS. 3 through 6, given for the purpose of illustration, show the comparative transmission characteristics of a particular delay line under four different types of mechanical loading and demonstrate the improvement afforded by loading in accordance with the invention.

Referring now to the drawings and particularly to FIG. 1, the strip delay line 11 is wound into a flat spiral so as to constitute a compact package. To prevent loss of energy, the line should be wound with a slight spacing between adjacent major surfaces. The line is rigidly clamped between the baseboard 12 and two or more rectangular blocks 13 by tightening up on the bolts or screws 14. As will be explained hereinafter, the minor surfaces are dead surfaces and thus the line can be clamped in the described fashion without loss of energy. Transducers 15 are bonded to the end faces of the strip by conventional techniques. A pair of wires 16 are connected to each of the transducers whereby one of the latter serves as the signal input to, and the other as the output from, the delay line. As will be clear to those in the art, the electrical and physical connections at each of the ends of the line are similar and therefore either transducer can be used as the output or input.

In FIG. 2 there is shown an enlarged view of the input end of a nondispersive delay line. As indicated, the delay medium 11 is in the form of a strip having a width dimension, $W_s$, substantially greater than the thickness dimension, $T_s$. Ideally, the delay medium should be an isotropic material, such as aluminum, glass or vitreous silica, but polycrystalline materials such as ordinary metallic alloys (e.g., aluminum alloy, 5052–H32, having 95–97 percent aluminum, 2 percent magnesium, 0.2 percent chromium) have proven satisfactory provided grain size is sufficiently small compared to the wavelength of the elastic wave motion carried by the strip.

A thickness-shear mode transducer 15, such as a Y-cut piezoelectric crystal or a thickness-shear mode BaTiO$_3$ ceramic transducer, is bonded to the end face 17 of the strip using standard techniques. The transducers are of simple geometrical form thus permitting relative ease in cutting to final size and in poling and bonding. The arrow on the transducer 15 indicates the desired direction of poling or polarization thereof, this polarization being perpendicular to the length axis and the minor surfaces of the strip. Accordingly, when the transducer is excited by an alternating voltage applied to the electroded areas of the major surfaces, a thickness-shear vibration is induced therein. This vibration in turn produces an elastic shear wave motion in the strip. As indicated in FIG. 2, in this wave motion each individual particle 18 in the strip moves perpendicular to the length axis and parallel to the direction of polarization in the transducer.

With the shear wave particle motion parallel to the major surfaces of the strip, no energy is lost and no mode conversion takes place as a result of reflections from said major surfaces. However, shear wave motion in any other orientation would result in energy loss and mode conversion.

The major surfaces of the strip guide the elastic wave motion as the same propagates down the line. When the propagated energy reaches the transducer at the opposite end, a thickness-shear vibration is induced in the latter and converted by the transducer to electrical energy.

As will be discussed more fully hereinafter, this geometry of the delay medium can support many modes of shear wave motion. The lowest or zeroth mode is non-dispersive throughout the entire frequency spectrum. The higher modes are all dispersive, each with its own cut-off frequency. At the cut-off frequency, the thickness of the strip, $T_s$, is equal to a half wavelength. And, the cut-off frequencies of the higher dispersive modes are integral multiples of the cut-off frequency for the lowest dispersive mode. It is, accordingly, possible to operate a strip delay line in two different conditions of pulse propagation, namely, with or without dispersion.

To propagate pulses without dispersion, the line is designed in the following way. The strip is made thin enough (less than a half wavelength) that the high frequency limit of the desired passband is less than the cut-off frequency in the first dispersive mode. In this manner, dispersive mode propagation is prevented.

The reflections of the wave motion from the minor surfaces of the strip result in energy loss, unwanted mode conversion, and the production of spurious signals. The effects of the undesirable interactions of the main elastic wave motion with the minor surfaces are reduced, however, in accordance with the invention, in two ways. First, the dimensions $W_s$ and $L_t$ are made large relative to a wavelength. That is, the line is designed so that $L_t$ (length of transducer) is of the order of ten or more wavelengths at the low frequency limit of the desired passband. This ensures an almost pure thickness-shear vibration in the transducer itself and, further, provides a radiated beam having an extremely narrow main lobe. The dimension $W_s$ is made larger than $L_t$ so as to aid in keeping the main portion of the beam away from the minor surfaces. The extent that $W_s$ exceeds $L_t$ is not critical.

To further reduce the aforementioned undesirable interaction of the main elastic wave motion with the minor surfaces, the boundary conditions at said minor surfaces are altered. This is accomplished, in accordance with the invention, by coating or covering the minor surfaces as well as the adjacent major surfaces with absorbers 19. The absorber material preferably comprises an adhesive with a cloth or plastic type backing. The use of absorber material along the minor surfaces of the strip is not by itself sufficient. It is only when said absorber material is also placed on each of the major surfaces adjacent said minor surfaces that significant reduction in said interactions is obtained. This is partly explainable on the basis that placing the absorber material along the major as well as minor surfaces increases the total opportunity for interaction between the absorbent and the beam incident upon the minor surfaces.

As illustrated in FIG. 2 of the drawings, the absorber material should extend inwardly, along the major surfaces, no further than the lines 21 which are drawn from the ends of the transducer 15. Any further inward extension results in excessive absorption of the energy of the main beam. Also, to prevent unnecessary energy absorption, the absorber material need not be extended, longitudinally, to the very ends of the delay line but may be terminated a short distance therefrom. This distance is not critical.

Since the minor surfaces, treated in the above-described fashion, are dead surfaces, the line may be rigidly clamped anywhere along its length, as shown in FIG. 1, without loss of energy. This greatly simplifies the problem of packaging the delay line.

FIGS. 3 through 6 show the extent of improvement for loading in accordance with the invention. The nature of the loading is represented by the small inset on each figure and it may thus be seen by FIG. 3 representing a condition of no loading, FIG. 4 loading on the minor surfaces alone, FIG. 5 loading on the minor surfaces and a portion of the adjacent major surfaces in accordance with the invention and FIG. 6 loading upon the major surface portions alone.

The delay line in each case was made from a strip of Formbrite (a commercial alloy of brass having very small grain size). The strip was 3 feet long, 1 inch wide, and 0.010 inch thick. Ceramic transducers were attached to the end faces of the strip. These transducers were 0.700 inch long, 0.010 inch wide, and 0.0138 inch thick.

Figure 4:
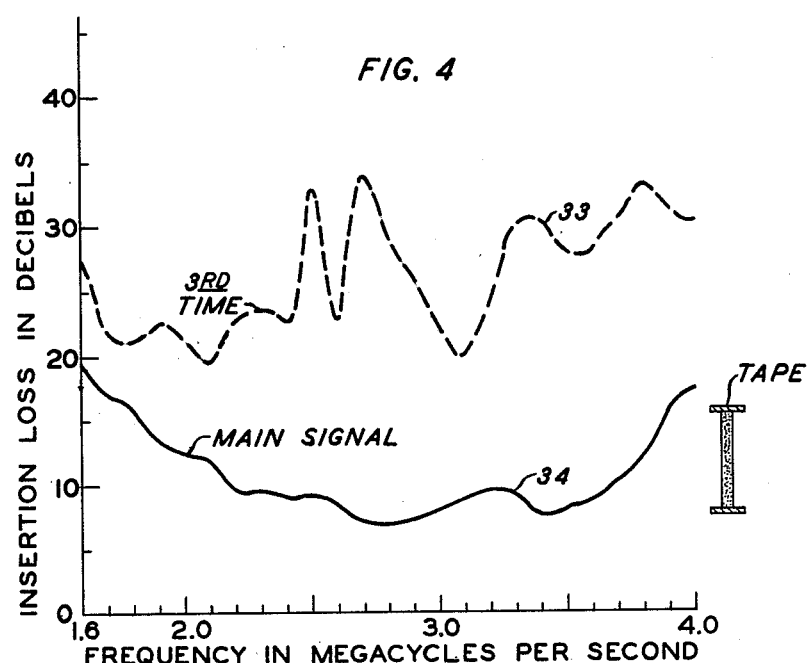

In each of the four cases represented by the FIGS. 4 through 6, the delay line was measured under the same electrical termination conditions. The midband frequency of the line (which coincides with the resonant frequency of the transducers) was 2.6 megacycles. Matched, symmetrical electrical termination conditions were used in order to obtain maximum suppression, attainable by electrical means, of the multiple travel signals.

FIG. 3 shows the insertion loss of the main signal as curve 32 and the level of the third-time-through spurious signal as curve 31, both as functions of frequency for the condition of no loading. Note the ripples in the loss characteristic 32 of the main signal. The third-time-through signal is suppressed only 8 to 10 db at some places within the 3 db bandwidth of the line.

FIG. 4 shows the electrical characteristics of the line with loading in the form of an absorbent tape only upon the minor surfaces along the whole length of the line. Note that the shape and the level of both curves 33 and 34 have been affected only slightly. Hence, tape on the minor surfaces alone contributes negligibly to the performance of the line.

In FIG. 5 the tape was folded over to cover portions of the major faces as well as the minor surfaces. Since the tape, before application, was ¼ inch wide and since the delay line strip is 0.010 inch thick, the tape extends in on each major face along the edge by an amount which places the tape edge at substantially the optimum point of line 21 as defined above in connection with FIG. 2. A 3 db bandwidth of approximately 1.5 megacycles is obtained and the loss curve 36 of the main signal is very smooth. The third-time-through signal shown by curve 35 is suppressed more than 20 db over most of the band. The characteristics shown in FIG. 5 are satisfactory and desirable for most applications. Note too, that adding the tape on the major faces has increased the loss only about 3 db over the minimum value of loss obtained with no tape.

FIG. 6 shows the electrical characteristics of the line when the tape was made ¼ inch wide along each edge. No tape was on the minor surfaces. Here the performance of the line is satisfactory, especially from the point of view of the third-time-through signal shown by curve 37 which has been suppressed more than 30 db throughout the 3 db passband with respect to the main signal represented by curve 38. The tape extends further than the optimum amount defined by line 21 and this accounts for the increase in loss to the main signal over that of FIG. 5.

Comparison of FIGS. 3 through 6 therefore shows that loading upon the major surface portions adjacent to the minor surfaces produces a substantial improvement over either no loading or loading upon only the minor surfaces. Further, when accompanied by loading upon the major surface portions, minor surface loading is not deleterious and substantially contributes to the ease with which the structure may be fabricated. The extent along the longitudinal length of the path is also important. For lines of relatively short length it is preferred for the loading to extend substantially from the input to the output transducer as noted above. For very long lines, however, the tolerable degree of absorption of the main ultrasonic signal must be considered. Thus, a determination must be made for a particular application as to whether the mode purity or the power of energy delivered to the output transducer is most important. In the usual case a compromise will be made.

Further details of dispersive and nondispersive mode of propagation along delay lines of the type described and of transducer designs particularly adapted for one or the other mode of operation may be found in my above-mentioned copending application.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A delay line comprising an elongated thin strip of ultrasonic transmission material, said strip having a rectangular cross-section with a width dimension many times that of the thickness dimension, ultrasonic transducer means mounted at one end of said strip of transmission material for generating in said strip an elastic wave motion, ultrasonic transducer means mounted at the other end of said strip for generating electrical signals in response to the wave motion in the strip, and means for minimizing the effect of spurious signals and multiple reflections along said line comprising a tape of acoustical absorbing material having a length extending along a major portion of the length of said strip between transducers and having a width wrapped around at least one minor surface of said strip and covering a minor fractional portion of the major surface of said strip adjacent to said minor surface, the remaining portions of said strip being free from said absorbing material whereby a substantial portion of wave motion generated by said transducer at said one end travels to said other end without excessive interaction with said absorbing material and said minor surfaces.

2. A delay line comprising an elongated thin strip of ultrasonic transmission material, said strip having a rectangular cross-section with a width dimension many times that of the thickness dimension, a first ultrasonic transducer mounted at one end of said strip of transmission material, said transducer being polarized in a given direction relative to the length axis and the minor surfaces of said strip, means for inducing ultrasonic vibrations in said transducer, a second ultrasonic transducer mounted at the other end of said strip, said second transducer being polarized in said given direction so that electrical signals are generated by said second transducer in response to vibrations produced on said strip by said first transducer, and means for minimizing the effect of spurious signals and multiple reflections along said line comprising acoustical absorbing material located upon a narrow region of said strip that extends along the edges of the major surfaces of said strip adjacent to the minor surfaces of said strip with the remaining portions of the surfaces being free from said absorbing material whereby a substantial portion of wave motion generated by said transducer at said one end travels to said other end without excessive interaction with said absorbing material and said minor surfaces.

3. The delay line according to claim 2 wherein the width of said narrow region is substantially one-half the difference in the width of said strip and the length of said transducers.

4. In combination with a delay line comprising an elongated thin strip of ultrasonic transmission material, said strip having a rectangular cross section with a width dimension many times that of the thickness dimension, thickness-shear mode transducer means mounted at one end of said strip of transmission material for generating in said strip an elastic shear wave motion in which the individual particle motion in said strip is perpendicular to the length axis and the minor surfaces of the strip, and thickness-shear mode transducer means mounted at the other end of said strip for generating electrical signals in response to the shear wave motion in the strip, and means for minimizing the effect of spurious signals and multiple reflections along said line comprising a tape of acoustical absorbing material having a length extending along a major portion of the length of said strip between said transducers and having a width wrapped around at least one minor surface of said strip and covering a minor fractional portion of the major surface of said strip adjacent to said minor surface, the remaining portions of said strip being free from said absorbing material.

References Cited in the file of this patent

UNITED STATES PATENTS

| | | |
|---|---|---|
| 2,662,217 | Roberts | Dec. 8, 1953 |
| 2,672,590 | McSkimin | Mar. 16, 1954 |
| 2,703,867 | Arenberg | Mar. 8, 1955 |
| 2,727,214 | McSkimin | Dec. 13, 1955 |
| 2,859,415 | Fagen | Nov. 4, 1958 |
| 2,872,577 | Hart | Feb. 3, 1959 |
| 3,041,556 | Meitzler | June 26, 1962 |
| 3,064,213 | Mason | Nov. 13, 1962 |